May 12, 1959 J. Q. WOOD 2,886,567
CARBON BLACK PLANT EMERGENCY SHUTDOWN SYSTEM
Filed Dec. 28, 1956
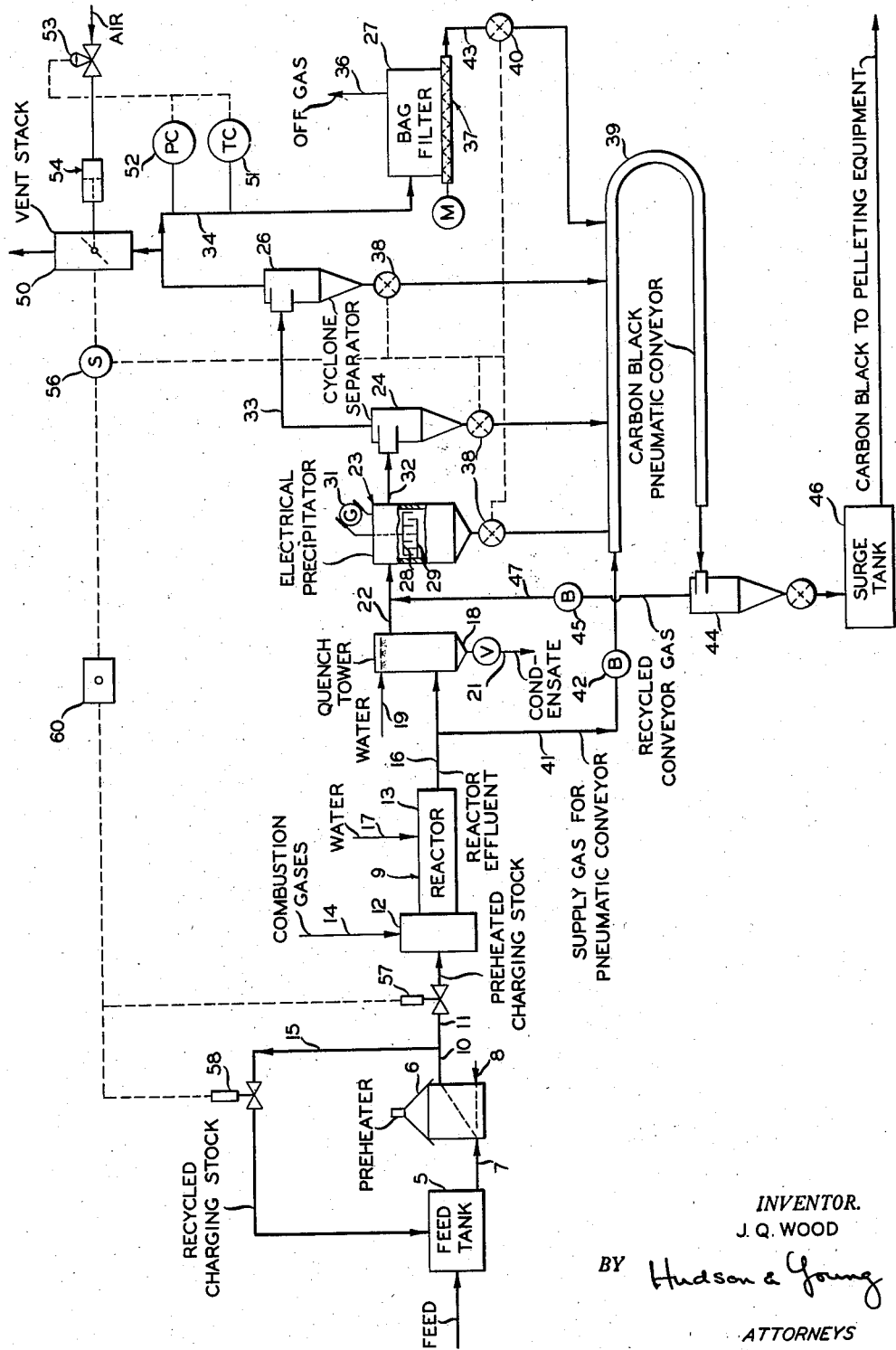
INVENTOR.
J. Q. WOOD
BY Hudson & Young
ATTORNEYS United States Patent Office 2,886,567
Patented May 12, 1959

2,886,567

CARBON BLACK PLANT EMERGENCY
SHUTDOWN SYSTEM

James Q. Wood, Bartlesville, Okla., assignor to Phillips Petroleum Company, a corporation of Delaware Application December 28, 1956, Serial No. 631,181

12 Claims. (Cl. 23—259.5)

This invention relates to the minimization of atmospheric pollution during operation of a combustion process. More particularly, it relates to a method and apparatus for minimizing atmospheric pollution in an emergency situation during operation of a carbon black process.

In a conventional carbon black process and apparatus, such as that disclosed by Joseph C. Krejci, U.S. 2,641,534, the stream of hydrocarbon charging stock is preheated in a Dutch oven-type heater or vaporizer and the resulting preheated charging stock is continuously injected into a reactor or furnace where it is incompletely burned with combustion gases to produce carbon black. Alternatively, the stream of hydrocarbon charging stock in a carbon black process can be preheated by passing it from a feed tank to an indirect heat exchanger installed in the gas effluent or smoke pipe downstream from the reactor. The effluent gas from the reactor, which gas contains suspended carbon black, is conducted to a quench unit and subsequently to separators, such as an electrical precipitator, cyclone separators, and bag filter units for the recovery of carbon black from the effluent gas. The separators each generally comprise a gravity collection chamber having an outlet conduit for carbon black. A carbon black feeder, such as a motor operated star valve, positioned in this outlet conduit controls the flow of carbon black therethrough. The carbon black is thus discharged into a pneumatic conveyor conduit. Gas for the pneumatic conveyor may be supplied by a side stream from the reactor effluent gas upstream from the quench unit. The carbon black separated in the bag filter unit is also discharged through a carbon black feeder into the same or another pneumatic conveyor and all of the collected carbon black can be conveyed to a small cyclone separator and then discharged into a surge tank. The carbon black from the surge tank is conducted to suitable pelleting equipment for further processing and handling. The conveyor gas from this last separator generally contains a small but valuable amount of suspended carbon black and it is desirable to recycle this conveyor gas to the main stream of reactor effluent upstream of the various separators.

During operation of the carbon black process various emergency situations often arise due to excessive temperature and/or pressure conditions in the collection system. In order to prevent damage to the filter bags in the bag filter unit and also to prevent explosion hazards from arising in the collection system, it is often desirable to discharge the reactor effluent to the atmosphere at a point between the last separator and the bag filter unit. The venting of this reactor effluent (from which some carbon black may have been separated) to the atmosphere is not without the attendant problem of atmosphere pollution. This pollution of the atmosphere is due to the continuous combustion of the hydrocarbon stock and the continuous discharge of the carbon black from the separators and bag filter unit into the pneumatic conveyor during the venting operation.

Accordingly, an object of this invention is to minimize atmospheric pollution during operation of a combustion process. Another object is to provide a methd and apparatus for minimizing atmospheric pollution in an emergency situation during operation of a carbon black process. Further objects and advantages of this invention will become apparent to those skilled in the art, from the following discussion, appended claims, and the accompanying single drawing which is a flow diagram illustrating the application of my invention in a carbon black process.

Although my invention is particularly applicable in a carbon black process, and the invention will be described hereinafter as applied thereto, it is to be understood that it is not to be unduly limited thereto, but rather it is applicable in combination with any combustion process involving the burning of combustible mixtures with or without other reactants.

I propose, according to my invention, to minimize atmospheric pollution in the operation of a carbon black plant when an emergency situation arises because of an excessive pressure and/or temperature condition in the collection system. When such an emergency situation arises, the reactor effluent is discharged to the atmosphere through a vent stack at a point between the last cyclone separator and the bag filter unit. Simultaneously with the opening of the vent stack, the hydrocarbon charging stock stream which is normally continuously fed to the reactor for combustion thereof by-passes the reactor and can be recycled to the charging stock source. At the same time, the carbon black feeders in the discharge conduits of various separators and bag filter unit are stopped, thereby preventing the discharge of collected carbon black into the pneumatic conveyor conduit. When these latter operations occur the tangential combustion gases can still be continuously introduced into the reactor so as to provide a source of supply gas for the pneumatic conveyor which is desirably continued in operation during the emergency situation. In addition, the continuous burning of the tangential combustion gases maintains the collection system at a proper temperature, thereby preventing cooling of the collection system below an undesirable point and preventing the condensation of any moisture present in the collection system. During the emergency situation the conveyor gas from which has been separated substantially all of the collected carbon black, is recycled from the terminal end of the pneumatic conveyor to the main stream of reactant effluent at a point upstream of the separators. A fuller understanding of my invention will be realized from the following discussion and reference to the accompanying flow diagram which schematically outlines a portion of a carbon black plant illustrating the application of my invention in combination therewith.

Hydrocarbon charging stock, such as a heavy oil (of the aromatic type) derived from a cracking process which has an API gravity of 0-10°, is supplied from feed tank 5 and conducted to a preheater or vaporizer 6 via line 7. The preheater 6, which can be direct-fired preheater of the Dutch oven-type (or, alternatively, can be installed in the reactor effluent pipe), preheats the charging stock to a selected temperature or range of temperatures, such as 450-550° F. in the case of heavy oil of the aromatic type, by the use of combustion gas, electricity, steam, or other suitable heating means 8.

During normal operations, the resulting preheated charging stock is conducted to a reactor or furnace, generally designated 9, via lines 10 and 11. The reactor 9 can have a short, expanded, cylindrical section 12 at the feed end and a smaller elongated cylindrical section 13 directly connected with the expanded section. Combustion gases, such as a mixture of air and natural gas, can feed tangential fuel into the reactor via line 14. The preheated charging stock in lines 10 and 11 can be axially introduced into the expanded section 12 of the reactor 9. In operation, the reaction zone of the reactor 9 remains at a substantial uniform temperature, for example, on the order of 1500° F. to 3300° F., depending on the quality of the carbon black desired to be produced. In starting the operation of the reactor it is preferred to preheat it to a temperature, for example, in excess of 100° F., using sufficient air to provide complete combustion of the tangential fuel before introducing the axial charging stock stream. The charging stock is converted by a pyrolytic reaction and/or incomplete combustion into a gaseous effluent leaving the reactor 9 by a discharge conduit 16. While not essential to the process, it is usual to quench the effluent in the discharge conduit 16 by direct heat exchange with the atmosphere through the walls of said conduit, and in many instances to supplement such quenching by heat exchange with water jackets (not shown) and/or by the direct injection of water from pipe 17 in the form of a spray. The amount of water added directly to the gaseous effluent is regulated so that in cooling said effluent by evaporation of said water, all of said water is completely evaporated and passes as a vapor through the system. The discharge conduit 16 can convey the reactor effluent to a secondary quenching unit or quench tower 18 where further addition of water can be made via line 19. Any moisture which may condense in quench tower 18 is removed via line 21 which is provided with a suitable drain valve.

The quenched reactor effluent is subsequently conducted from the quench tower 18 via line 22 to a collection system which comprises a plurality of suitable separator units which can be any conventional means for separating solids from gases by a dry separation step; the number of separators employed can be varied from one to as many as desired. For purposes of illustrating a preferred employment of my invention, a specific set of carbon black separators which have been found useful in a full-sized commercial carbon black plant have been illustrated in the drawing. They consist of an electrical precipitator 23, cyclone separators 24, 26, and a bag filter unit 27. The use of the precipitator 23 is alternative.

The electrical precipitator 23 comprises pairs of oppositely charged plates or wires 28, 29, having a direct or alternating high potential current of opposite polarity thereon generated by suitable electrical generating means 31. The gaseous effluent in line 22 is passed between the pairs of charged plates 28, 29 to precipitate a certain amount of carbon black which separates as flocculent material in the bottom of the precipitator 23. A certain amount of agglomeration occurs in the carbon black remaining suspended in the gaseous effluent which is discharged from the precipitator 23 into line 32.

The gaseous effluent in line 32 is conducted to cyclone separator 24 and tangentially introduced therein. Some of the suspended carbon black in the gaseous effluent is thrown against the cylindrical walls of separator 24 and falls to the bottom as flocculent material, but often a considerable amount of carbon black remains suspended in the gaseous effluent and passes out through a cylindrical discharge pipe at the top of the separator 24 into line 33. While in some instances one cyclone separator is enough, it has been found advantageous to use a plurality of separators. The percentage of carbon black removed from a cyclone separator varies with the velocity of the gaseous effluent and those skilled in the art will be able to readily determine the number, size, design, and velocities involved to produce desirable results. The gaseous effluent in line 33 can be conveyed to cyclone separator 26 which functions in the same manner as cyclone separator 24 to remove a further amount of suspended carbon black.

The gaseous effluent discharged from cyclone separator 26 via line 34 is further conducted to a bag filter unit 27 for further recovery of suspended carbon black. Bag filter unit 27 can be divided into a plurality of chambers in which there are suspended a plurality of bag filtering members which can be made from cloth, nylon, or other gas permeable fabric. This fabric substantially completes the removal of the suspended carbon black from the gaseous effluent and the carbon black-free off-gas can be discharged to the atmosphere via stack 36. This off-gas generally comprises such gases as nitrogen, carbon dioxide, carbon monoxide, hydrogen and water vapor. The carbon black separated by the bag filtering units can be dislodged from the gas permeable fabric by shaking the same or repressurizing the filtering compartments with a suitable gas so that the carbon black may be discharged into a suitable conveyor 37 which can be, for example, a motor operated screw-type conveyor.

The electrical precipitator 23 and the cyclone separators 24, 26 each comprise a gravity collection chamber at their lower portions, which may be made conical as shown, to aid in the discharge of carbon black through an outlet conduit controlled by a carbon black feeder 38. Various types of carbon black feeders may be employed, the conventional type of star valves shown in the drawing being preferred. The star valves 38 are not shown in detail as they are well known devices similar to a revolving door having a paddle wheel with radial blades which allow the passage of solids by gravity as the paddle wheel rotates, while two or more of the radial paddles obstruct or substantially prevent the unregulated passage of gas through the carbon black feeder in either direction. Each of the star valves 38 can be operated by a suitable electrical motor. In order to convey the carbon black discharged by the carbon black feeders 38, one or more pneumatic conveyors such as pneumatic conveyor 39 are provided. Conveyor 39 can be supplied with a side stream of reactor effluent via line 41 which can be provided with a suitable gas blower 42 which is controlled and operated by a suitable motor.

The collected carbon black in the bag filter unit 27 is discharged from conveyor 37 through a carbon black feeder such as a motor operated star valve 40 in line 43 into a pneumatic conveyor which can be separated or, as shown, in common with conveyor 39.

All of the carbon black discharged from the various separators can be conveyed via conveyor 39 to a suitable collection point at the terminal end of the conveyor 39. A small cyclone separator 44 at this end of the conveyor 39 can serve to separate the conveyed carbon black from the conveyor gas, discharging the collected carbon black into a suitable surge tank 46 from which the carbon black can be supplied to suitable pelleting equipment for further processing and handling. The off-gas from separator 44, which gas may contain a small but valuable amount of suspended carbon black, is recycled to the collection system via line 47 (which can be provided with blower 45) to a point upstream from the separators, preferably to a point upstream from the electrical precipitator 23.

During normal operations, the pressure in the collection system will generally be in the range of 2–6 inches of water gage, and the temperature will be, generally, in the range of 400° F. to 450° F.

As pointed out hereinbefore, it is desirable to vent to the atmosphere the gaseous carbon black-containing effluent at a point between the cyclone separators and the bag filter unit during emergency conditions arising due to excessive pressure and/or temperature in the collection system so as to prevent damage to the bag filter unit and other portions of the collection system. Heretofore this has been accomplished by discharging the gaseous effluent to the atmosphere through a vent stack 50 connected to the discharge line 34 between the last cyclone separator 26 and bag filter unit 27. Pollution of the atmosphere to an undesirable degree thus occurred since the reactor was continued in operation, that is, preheated charging stock was continuously burned in the reactor during the opening of the vent stack. During the venting operation the carbon black was continuously discharged from the separators 23, 24, 26 and the bag filter unit 27 into the pneumatic conveyor 39 with the consequent presence of an undesirable amount of suspended carbon black in the recycled conveyor gas in line 47 which carbon black was vented at the atmosphere through the open vent stack 50. The means whereby this atmospheric pollution is minimized according to the practice of my invention will now be set forth.

Temperature controller 51 is connected to a suitable temperature sensing element in discharge line 34. In addition, a pressure controller 52 can be connected to a pressure sensitive element in line 34. Both of these controllers 51, 52, or one or the other, are connected to a suitable means whereby excessive pressure (e.g., 8 inches of water gage) and/or temperature (e.g., 500° F.) in the effluent line 34 cause the opening of the vent stack 50. Specifically, this means can comprise an air operated motor valve 53 which is operatively connected to an air operated damper valve generally designated 54 (shown in its open position) positioned in the vent stack 50. The damper valve 54 can be operatively connected to a suitable switch 56. Should an excessive temperature and/or pressure condition exist in the discharge line 34, the damper valve 54 is accordingly opened, thereby permitting the discharge of gaseous effluent to the atmosphere, and immediately causing the actuation of switch 56.

The switch 56 can be operatively connected to a valve, such as solenoid-actuated valve 57, in charging stock supply line 11. Switch 56 can also be operatively connected to a valve, such as solenoid-actuated valve 58, positioned in recycle charging stock line 15. Actuation of switch 56 consequently operates valve 57 and valve 58 whereby the former is closed and the latter is opened, thus causing the preheated charging stock in line 10 to bypass the reactor 9 and be recycled to the feed tank 5 via line 15; consequently, no charging stock is supplied to the reactor 9 and thus no further carbon black is produced during the emergency condition.

Switch 56 is also operatively connected to the motors (not shown) controlling the operation of the star valves 38 in the discharge conduits of the electrical precipitator 23, cyclone separators 24, 26, and the star valve 40 in the discharge conduit 43 of the bag filter unit 27. Consequently, no collected carbon black is discharged into the pneumatic conveyor 39. The amount of suspended carbon black in the recycled conveyor gas being conducted in line 47 is accordingly reduced or substantially absent, thereby reducing the amount of carbon black vented to the atmosphere through the vent stack 50.

A manual reset switch 60, such as a magnetic switch or push button station, can be provided so as to permit a return to normal operation of the process when the cause of the emergency situation has been corrected.

During the emergency condition the pneumatic conveyor 39 and screw conveyor 37 preferably remain in operation, supply gas for conveyor 39 being supplied via line 41 as a result of the continuous burning of the combustion gases introduced to reactor 9 via line 14 during the emergency condition. It is desirable to keep the pneumatic conveyor 38 in operation in order to prevent condensation of moisture, adherence of carbon black to the walls of the conveyor, etc. Alternatively, the temperature controller 51 and/or pressure controller 52 can be operatively connected to switch 56 so as to cause actuation of the latter independently of damper valve 54. This modification would permit the switch 56 to operatively control valves 57, 58 and carbon black feeders 38, 40, especially valves 57, 58, even if damper valve 54 fails.

Switch 56 can be any suitable temperature or pressure responsive switch, for example, a diaphragm pressure switch having a pair of snap-action contacts which come into junction when a predetermined pressure exists, or a pressure switch of the mercury bulb contact type having a pressure sensing element.

The following table shows the condition of all important valves and carbon black feeders during normal plant operations and during an emergency condition due to excessive pressure and/or temperature in the collection system.

Table

| Item | Normal Plant Operations | Emergency Condition |
| --- | --- | --- |
| Valve 54 | Closed | Open. |
| Valve 57 | Open | Closed. |
| Valve 58 | Closed | Open. |
| Carbon black feeders 38, 40 | Activated | Deactivated. |

Preferably the operations described hereinbefore are automatically controlled; however, it is within the scope of my invention to measure the pressure and/or temperature in the discharge line 34 and to manually operate valves 54, 57, 58, 38, and 40. It is also to be understood that my invention is not limited to any particular reactor figuration or separator or bag filter unit, or to any particular type of charging stock.

Various modifications and alterations of my invention will become apparent, to those skilled in the art, from the foregoing description and accompanying drawing without departing from the scope and spirit thereof, and it is to be understood that they do not unduly limit my invention since they are merely preferred embodiments thereof.

I claim:

1. In a system for burning a combustible mixture including a first conduit for supplying a reactor with a hydrocarbon charging stock, a second conduit for conducting gaseous effluent from said reactor to separation means for separating solid suspended material from said effluent, said separation means comprising in series cyclone separator means and bag filtering means, a normally closed vent means in communication with said second conduit at a point therein between said cyclone separator means and said bag filtering means, first and second valves in said first conduit and said vent means respectively, said cyclone separator means and said bag filtering means each having an outlet conduit for said solid material, and feeder means controlling the flow of said solid material through said outlet conduit into conveyor means, the improvement comprising, in combination, sensing means operatively connected to said second conduit between said cyclone separator means and said bag filtering means and responsive to an emergency condition therein, and means operatively connected and responsive to said sensing means whereby said first valve is closed, said second valve is opened, said feeder means is deactivated when said emergency condition arises, said emergency condition being caused by at least one of the following: a predetermined excessive temperature and a predetermined excessive pressure.

2. System according to claim 1 wherein said emergency condition is caused by said predetermined excessive temperature.

3. System according to claim 1 wherein said emergency condition is caused by said predetermined excessive pressure.

4. In a system for producing carbon black including a reactor, first conduit means for supplying said reactor with a hydrocarbon charging stock, second conduit means for supplying combustion gases to said reactor, a discharge conduit for conducting gaseous effluent containing suspended carbon black from said reactor to carbon black separation means, the latter comprising in series cyclone separator means and bag filtering means each of said cyclone separator means and said bag filtering means having an outlet conduit for carbon black, a carbon black feeder means controlling flow of carbon black through each of said outlet conduits into conveyor means, a normally closed vent stack communicating with said discharge conduit at a point between said cyclone separator means and said bag filtering means, and first and second valve means in said first conduit and said vent stack respectively, the improvement comprising in combination, sensing means operatively connected to said discharge conduit between said cyclone separator means and said bag filtering means and responsive to an emergency condition therein, and means operatively connected and responsive to said sensing means whereby said first valve means is closed, said second valve means is opened, and said carbon black feeder means are deactivated when said emergency condition arises, said emergency condition being caused by at least one of the following: a predetermined excessive temperature and a predetermined excessive pressure.

5. In a system for producing carbon black including a reactor, a supply conduit for supplying said reactor with a hydrocarbon charging stock from a source thereof, a recycle conduit communicating at a first point with said supply conduit for recycling said charging stock to said source, a first valve in said supply conduit located downstream of said first point, a second valve in said recycle conduit, a conduit for supplying combustion gases to said reactor, a discharge conduit for conducting gaseous effluent containing suspended carbon black to carbon black separation means comprising in series cyclone separator means and bag filtering means each having an outlet conduit, a carbon black feeder controlling flow of carbon black through each of said outlet conduits into a pneumatic conveyor, separating means for separating conveyed carbon black from the conveying gases of said conveyor, a conduit for recycling said conveying gases to said discharge conduit at a second point, a normally closed vent stack communicating with said discharge conduit downstream of said second point between said cyclone separator means and said bag filtering means, and a third valve in said vent stack, the improvement comprising, in combination, sensing means operatively connected to said discharge conduit between said cyclone separator means and said bag filtering means and responsive to an emergency condition therein, and means operatively connected and responsive to said sensing means whereby said first valve is closed, said second and third valves are opened, and said carbon black feeder is deactivated when said emergency condition arises due to at least one of the following: a predetermined excessive temperature and a predetermined excessive pressure.

6. System according to claim 5 wherein said sensing means is a temperature controller, said means operatively connected thereto comprising a motor valve connected to said third valve, and a switch connected to said third valve, said first and second valves being motor valves operatively connected to said switch, the latter also being operatively connected to said carbon black feeder.

7. System according to claim 5 wherein said sensing means is a pressure controller, said means operatively connected thereto comprising a motor valve connected to said third valve, and a switch connected to said third valve, said first and second valves being motor valves operatively connected to said switch, the latter also being operatively connected to said carbon black feeder.

8. System according to claim 5 wherein said cyclone separator means comprises at least one cyclone separator having a gravity collection chamber to which said outlet conduit is connected, said carbon black feeder is a motor operated star valve, and said pneumatic conveyor is supplied with conveying gas by a branch conduit connected to said discharge conduit at a point upstream of said second point.

9. In a system for producing carbon black including a reactor, a supply conduit for supplying said reactor with a hydrocarbon charging stock from a source thereof, a recycle conduit communicating at a first point with said supply conduit for recycling said charging stock to said source, a first valve in said supply conduit located downstream of said first point, a second valve in said recycle conduit, a conduit for supplying combustion gases to said reactor, a discharge conduit for conducting gaseous effluent containing suspended carbon black to a plurality of carbon black separators connected in series in said discharge conduit, the last of said separators in a downstream direction being a bag filter, each of said separators having an outlet conduit for carbon black, a separate carbon black feeder comprising a motor controlling flow of carbon black through each of said outlet conduits, the latter discharging into a pneumatic conveyor which is supplied with conveying gas by a branch conduit connected to said discharge conduit at a second point, separating means for separating conveyed carbon block from said conveying gas, a conduit for recycling said conveying gases to said discharge conduit at a third point downstream of said second point, a normally closed vent stack communicating with said discharge conduit at a point immediately upstream of said bag filter, and a third valve in said vent stack, the improvement comprising in combination, sensing means operatively connected to said discharge conduit immediately upstream of said bag filter and responsive to an emergency condition therein, and means operatively connected and responsive to said sensing means whereby said first valve is closed, said second and third valves are opened, and the motor of said carbon black feeder is deactivated when said emergency condition arises due to at least one of the following: a predetermined excessive temperature and a predetermined excessive pressure.

10. In a system for producing carbon black including a reactor, a supply conduit for supplying said reactor with a hydrocarbon charging stock from a source thereof, a recycle conduit communicating at a first point with said supply conduit for recycling said charging stock to said source, a first motor valve in said supply conduit located downstream of said first point, a second motor valve in said recycle conduit, a conduit for supplying combustion gases to said reactor, a discharge conduit for conducting gaseous effluent containing suspended carbon black to a plurality of carbon black separators connected in series to said discharge conduit, the first of said separators being an electrical precipitator and the last of said separators being a bag filter with at least one cyclone separator located in said discharge conduit between said first and last separators, each of said separators having an outlet conduit for carbon black, a separate carbon black feeder comprising a motor controlling flow of carbon black through each of said outlet conduits, the latter discharging into a pneumatic conveyor which is supplied with conveying gas by a branch conduit connected to said discharge conduit at a second point upstream of said first separator, separating means for separating conveyed carbon black from said conveying gas, a conduit for recycling said conveying gases to said discharge conduit at a third point downstream of said second point, a normally closed vent stack communicating with said discharge conduit at a point upstream of said bag filter and downstream of said cyclone separator, and a damper valve in said vent stack, the improvement comprising, in combination, pressure and temperature controllers operatively connected to said discharge conduit at a point downstream of said cyclone separator and upstream of said bag filter, said controllers operatively connected to a third motor valve which in turn is connected to said damper valve, said controllers also operatively connected to a switch which in turn is operatively connected to said first and second motor valves and the motors of said carbon black feeders, said temperature controller operatively responsive to a predetermined excessive temperature in said discharge conduit and said pressure controller operatively responsive to a predetermined excessive pressure in said discharge conduit, whereby said damper valve and said second motor valves are opened, said first motor valve is closed, and said motors of said carbon black feeders are deactivated when either of said predetermined excessive temperature and pressure arises.

11. System according to claim 10 wherein said predetermined excessive temperature is at least 500° F.

12. System according to claim 10 wherein said predetermined excessive pressure is at least 8 inches of water gage.

References Cited in the file of this patent

UNITED STATES PATENTS

| | | |
|---|---|---|
| 1,797,368 | Rumbarger | Mar. 24, 1931 |
| 2,776,725 | Wood | Jan. 8, 1957 |
| 2,785,960 | Ribble et al. | Mar. 19, 1957 |